(12) United States Patent
Messick et al.

(10) Patent No.: US 8,906,233 B2
(45) Date of Patent: Dec. 9, 2014

(54) RING GRIT REMOVER WITH VANES

(75) Inventors: Harrison J. Messick, Shawnee, KS (US); Frank G. Weis, Kansas City, MO (US); Francis M. Noonan, Osawatomie, KS (US)

(73) Assignee: Smith & Loveless, Inc., Lenexa, KS (US)

( * ) Notice: Subject to any disclaimer, the term of this patent is extended or adjusted under 35 U.S.C. 154(b) by 478 days.

(21) Appl. No.: 13/447,539

(22) Filed: Apr. 16, 2012

(65) Prior Publication Data
US 2013/0270169 A1 Oct. 17, 2013

(51) Int. Cl.
B01D 21/24 (2006.01)
B01D 21/26 (2006.01)

(52) U.S. Cl.
CPC ............ *B01D 21/26* (2013.01); *B01D 21/2411* (2013.01); *B01D 21/2472* (2013.01)
USPC ..................... 210/257.1; 210/512.3; 210/523; 210/532.1

(58) Field of Classification Search
USPC .......................... 210/257.1, 512.3, 523, 532.1
See application file for complete search history.

(56) References Cited

U.S. PATENT DOCUMENTS

| 3,941,698 A | 3/1976 | Weis |
| 4,107,038 A | 8/1978 | Weis |
| 4,519,907 A | 5/1985 | Rooney |
| 4,767,532 A | 8/1988 | Weis |
| 6,811,697 B2 | 11/2004 | Davis et al. |
| 6,881,350 B2 | 4/2005 | Wilson |

*Primary Examiner* — David A Reifsnyder
(74) *Attorney, Agent, or Firm* — Wood, Phillips, Katz, Clark & Mortimer (57) ABSTRACT

A grit removal apparatus has a central opening between a cylindrical separation chamber above a grit storage chamber. An influent flume introduces a liquid stream directly into a lower portion of the periphery of the separation chamber, and an effluent flume removes a stream through an opening in an upper portion of the separation chamber wall. Outwardly spiraling vanes extend upwardly at the bottom center of the separation chamber, and a vertical cylindrical duct is supported above the vanes. A tunnel is defined in the separation chamber by an upper wall at the bottom of that opening and an inner wall concentric with the separation chamber wall. A ring extends inwardly from the separation chamber wall, with the tunnel upper wall defining a portion of the ring. A propeller inside the duct rotates to draw fluid flow up through the duct toward the upper portion of the separation chamber.

21 Claims, 6 Drawing Sheets

RING GRIT REMOVER WITH VANES

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to a grit selector or trap for selectively removing sand and grit from a flowing stream of fluid.

BACKGROUND OF THE INVENTION

Grit is one of the most unpredictable and difficult materials a sewage treatment plant must handle. Grit can be defined as the heavy mineral matter present in sewage. It is principally made up of sand, gravel, and inorganic material with a specific gravity of 2.65 which reaches a sewage disposal plant. It is desirous to remove this material as it cannot be treated, reduced in size, or eliminated by treatment methods. It presents a problem to waste treatment as it is hard and abrasive. It wears pumps and other mechanical devices. It is heavy and accumulates in clarifiers, treatment basins, digesters, etc., where it must sometimes be removed by hand.

Grit removal devices of various designs have been proposed to remove grit from a flowing stream of water. Several such devices are shown, for example, in U.S. Pat. Nos. 4,519,907 and 6,881,350.

Another grit trap device is disclosed in U.S. Pat. No. 3,941,698 and includes an upper settling chamber and a lower grit storage chamber. The settling chamber, being of large diameter, communicates with the storage chamber through a relatively small opening in a substantially flat transition surface there between. Rotating paddles positioned within the settling chamber, a short distance above the transition surface, cause the flow of liquid entering the settling chamber adjacent the outer periphery to rotate about the chamber as a forced vortex resulting in an upward spiral flow which urges the settled particles across the transition surface towards the opening. The heavier settled particles fall through the opening into the storage chamber and the lighter organic particles rise in the spiral flow. The contents in the storage chamber are lightly air scoured prior to removal to cause any organics therein to be lifted out of the storage chamber and returned to the settling chamber.

A similar type of grit removal device as the one discussed hereinabove is disclosed in U.S. Pat. No. 4,107,038, in which a ramp is in communication with the flume portion of the inlet trough to cause grit to follow the ramp down towards the transition surface. A baffle is also positioned in the settling chamber against which the rotating liquid impinges to deflect the liquid downwardly into a generally toroidal flow pattern that spirals around the periphery of the settling chamber. The toroidal motion of the liquid moves the grit on the transition surface towards the center opening.

The above-described prior art devices operate on the forced vortex principle. In these devices the head at the periphery of the settling chamber is higher than at the center of the settling chamber. This causes liquid to flow down the wall of the settling chamber to the bottom thereof and across the bottom to the point of lower head at the center thereof. It is this transverse circulatory flow pattern which permits the device to work. The particulate matter in suspension must follow this path to reach the bottom of the settling chamber and be carried to the center of the transition surface to the storage chamber. This takes some time and some of the particulate matter may not travel the full circuit before it is caught in the flow passing out the effluent, which results in a lowering of grit removal efficiency. The influent flume and the effluent flume of the above-described devices are at right angles to each other and in most installations require a 90 degree bend to get them back in line.

In still other grit removal devices such as shown in U.S. Pat. Nos. 4,767,532 and 6,811,697, flow toward the center of a chamber is facilitated by a rotating propeller or paddle.

Grit removal devices as described above, whether operating by settling or vortex action, require a relatively large footprint, presenting space problems in designing overall treatment facilities in which the grit removal devices are only a part. Of course, larger devices are inherently more costly, and can use more energy. Further, such devices are not as well adapted as might be desired to operate efficiently in environments in which the range of flows encountered vary widely.

The present invention is directed toward, inter alia, one or more of the problems set forth above.

SUMMARY OF THE INVENTION

In one aspect of the present invention, a central flow drive is provided for an apparatus for separating grit from a liquid stream, where the apparatus includes a cylindrical separation chamber having an influent and an effluent flume for liquid with a cylindrical grit storage chamber disposed immediately below the separation chamber, the chambers separated by a transition surface having a centrally disposed opening therethrough for passage of separated grit to the grit storage chamber. The central flow drive includes a duct substantially cylindrical about an axis and adapted to be supported in the separation chamber above the centrally disposed opening in the transition surface, a plurality of vanes adapted to be secured between the duct and the transition surface in an upwardly extending orientation and spiraling outwardly from the duct in the same direction as liquid flow within the separation chamber, a propeller supported for rotation in the duct about the duct axis, rotation of the propeller drawing liquid in the duct upwardly, and a drive for rotating the propeller about the vertical axis.

In one form of this aspect of the present invention, when the duct is supported in the separation chamber, the duct axis is substantially vertical and rotation of the propeller is in the same direction as liquid flow within the separation chamber.

In another form of this aspect of the present invention, when supported in the separation chamber, the propeller rotates at a sufficient rate to cause a spiral flow pattern across the transition surface and between the vanes so as to cause heavier particles to pass through the opening into the grit storage chamber and lighter particles to be lifted upwardly through the duct.

In another aspect of the present invention, an apparatus is provided for separating grit from a liquid stream while retaining organic solids therein. The apparatus includes a cylindrical separation chamber, a cylindrical grit storage chamber having a smaller diameter than the separation chamber and disposed immediately below the separation chamber, with a transition surface separating the separation chamber and the storage chamber. A centrally disposed opening through the transition surface permits communication between the separation chamber and the storage chamber. An influent flume allows an influent liquid stream to be introduced directly into a lower portion of the separation chamber along the outer periphery thereof, and an effluent flume allows an effluent liquid stream to be removed from an upper portion of the separation chamber along the outer periphery thereof. A baffle is positioned within the separation chamber for directing the influent liquid stream entering the separation chamber outwardly toward a lower portion of the periphery of the separation chamber and preventing the spreading thereof across the transition surface. The baffle also narrows the influent liquid stream exiting the influent flume and makes it more laminar. A plurality of vanes are secured to and extend upwardly from the center of the transition surface, with the vanes spiraling outwardly from the grit storage chamber in a direction counter or reverse to liquid flow within the separation chamber. A cylindrical duct is supported above the vanes. A propeller is supported in the cylindrical duct above the transition surface for rotation about a substantially vertical axis in the same direction as liquid flow within the separation chamber to draw fluid flow across the transition surface up through the duct toward the upper portion of the separation chamber.

In one form of this aspect of the present invention, the propeller rotates at a sufficient rate to cause a spiral flow pattern across the transition surface and between the vanes so as to cause heavier particles to pass through the opening into the grit storage chamber and lighter organic particles to be lifted upwardly through the duct.

In another form of this aspect of the present invention, the propeller includes a plurality of propeller blades, and a drive shaft rotatable about the vertical axis is provided with mounting plates on each end of each propeller blade, whereby the mounting plates are selectively mounted to the drive shaft to secure a selected end of each propeller blade to the drive shaft.

In another form of this aspect of the present invention, the effluent flume is a channel tapered from a wide exit out of the separation chamber to a narrower portion spaced from the separation chamber.

In still another form of this aspect of the present invention, the baffle narrows the influent liquid stream exiting the influent flume. In a further form, the effluent flume is a channel tapered from a wide exit out of the separation chamber to a narrower portion spaced from the separation chamber.

In yet another form of this aspect of the present invention, a tunnel is provided in the grit separation chamber communicating with the effluent flume and defining an entrance to the effluent flume at a selected location in the separation chamber.

In still another aspect of the present invention, an apparatus is provided for separating grit from a liquid stream while retaining grit and processing organic solids for further treatment therein. The apparatus includes a separation chamber having an outer substantially vertical cylindrical wall and a bottom transition surface, and a cylindrical grit storage chamber having a smaller diameter than the separation chamber and disposed immediately below the separation chamber. The transition surface separates the separation chamber and the storage chamber and includes a centrally disposed opening therethrough permitting communication between the separation chamber and the storage chamber. An influent flume allows an influent liquid stream to be introduced directly into a lower portion of the separation chamber along the outer periphery thereof. An effluent flume channel allows an effluent liquid stream to be removed from an upper portion of the separation chamber through an opening in an upper portion of the separation chamber wall. A baffle is positioned within the separation chamber for directing the influent liquid stream entering the separation chamber outwardly towards a lower portion of the periphery of the separation chamber and preventing the spreading thereof across the transition surface. A tunnel is defined by a portion of the separation chamber wall, an upper wall, and an inner generally arcuate wall, where the portion of the separation chamber wall is the wall beneath the effluent flume opening in the separation chamber wall, the upper wall extends substantially radially into the separation chamber from the separation chamber wall from in front of the separation chamber wall opening, and the inner wall is generally concentric with the separation chamber wall portion. The height of the top of the upper wall and the effluent flume channel bottom are substantially the same, and a propeller is supported above the transition surface for rotation about a substantially vertical axis in the same direction as liquid flow within the separation chamber to draw fluid flow up through the duct toward the upper portion of the separation chamber.

In one form of this aspect of the present invention, a ring extends inwardly from the separation chamber wall with the tunnel upper wall defining a portion of the ring, the ring being above the lower portion of the periphery of the separation chamber.

In another form of this aspect of the present invention, the effluent flume channel is tapered from a wide opening in an upper portion of the separation chamber wall to a narrower portion spaced from the separation chamber.

In still another form of this aspect of the present invention, the baffle narrows the influent liquid stream exiting the influent flume. In a further form, the effluent flume channel is tapered from a wide opening in an upper portion of the separation chamber wall to a narrower portion spaced from the separation chamber.

In yet another aspect of the present invention, an apparatus is provided for separating grit from a liquid stream while retaining organic solids therein, including a separation chamber having an outer substantially vertical cylindrical wall and a bottom horizontal transition surface, and a cylindrical grit storage chamber having a smaller diameter than the separation chamber and disposed immediately below the separation chamber. The transition surface separates the separation chamber and the storage chamber and including a centrally disposed opening therethrough permitting communication between the separation chamber and the storage chamber. An influent flume allows an influent liquid stream to be introduced directly into a lower portion of the separation chamber along the outer periphery thereof. An effluent flume channel allows an effluent liquid stream to be removed from an upper portion of the separation chamber through an opening in an upper portion of the separation chamber wall. A baffle is positioned within the separation chamber for directing a narrowed influent liquid stream entering the separation chamber outwardly towards a lower portion of the periphery of the separation chamber and preventing the spreading thereof across the transition surface. A plurality of vanes are secured to and extend upwardly from the transition surface, with the vanes spiraling outwardly from the grit storage chamber a direction reverse or counter to the liquid flow within the separation chamber, and a cylindrical duct is supported above the vanes. A tunnel is defined by a portion of the separation chamber wall, an upper wall, and an inner generally arcuate wall, where the portion of the separation chamber wall is the wall beneath the effluent flume opening in the separation chamber wall, the upper wall extends substantially radially into the separation chamber from the separation chamber wall from in front of the separation chamber wall opening, and the inner wall is generally concentric with the separation chamber wall portion. The height of the top of the upper wall and the effluent flume channel bottom are substantially the same, and a ring extends inwardly from the separation chamber wall, with the tunnel upper wall defining a portion of the ring and the ring being above the lower portion of the periphery of the separation chamber. A propeller is supported above the transition surface for rotation about a substantially vertical axis in the same direction as liquid flow within the separation chamber to draw fluid flow up through the duct toward the upper portion of the separation chamber.

In one form of this aspect of the present invention, the propeller rotates at a sufficient rate to cause a spiral flow pattern across the transition surface and between the vanes so as to cause heavier particles to pass through the opening into the grit storage chamber and lighter particles to be lifted upwardly through the duct.

In another form of this aspect of the present invention, the effluent flume channel is tapered from a wide opening in an upper portion of the separation chamber wall to a narrower portion spaced from the separation chamber.

In still another form of this aspect of the present invention, the baffle narrows the influent liquid stream exiting the influent flume. In a further form, the effluent flume channel is tapered from a wide opening in an upper portion of the separation chamber wall to a narrower portion spaced from the separation chamber.

Other objects, features, and advantages of the invention will become apparent from a review of the entire specification, including the appended claims and drawings.

DETAILED DESCRIPTION OF THE PREFERRED EMBODIMENT

The drawing shows an apparatus 10 for separating grit from incoming liquid sewage in accordance with the present invention. A circular cylindrical separation chamber or basin 11 is disposed immediately above and concentric with a cylindrical grit storage chamber 12 (see FIGS. 2b and 3) of a lesser diameter. A substantially flat transition surface or floor 13, including a removable plate 14 centered in the chamber 12, separates chambers 11 and 12.

Figure 2A:
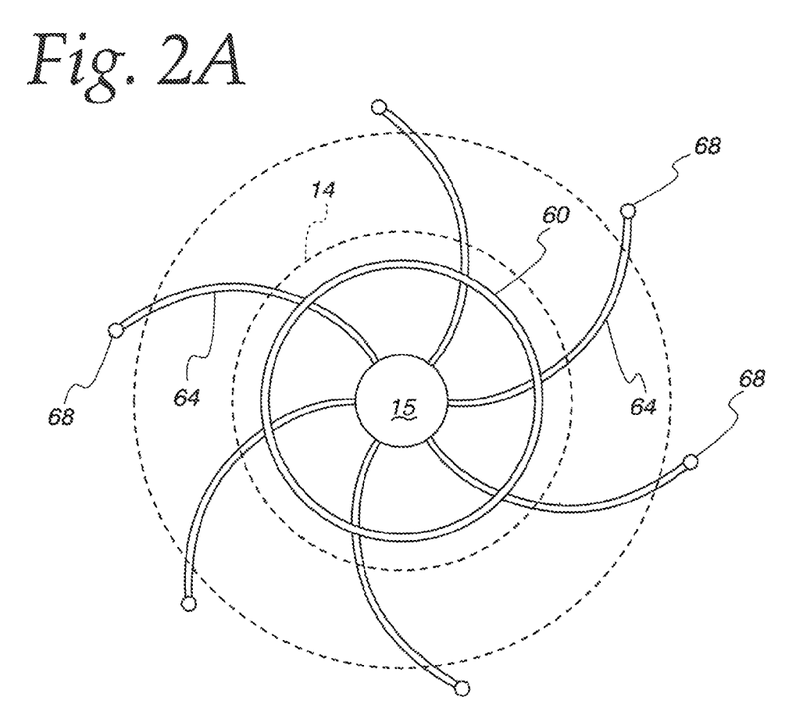
FIG. 2A is a top view illustrating the duct and vanes of the FIG. 1 embodiment.
Figure 2B:
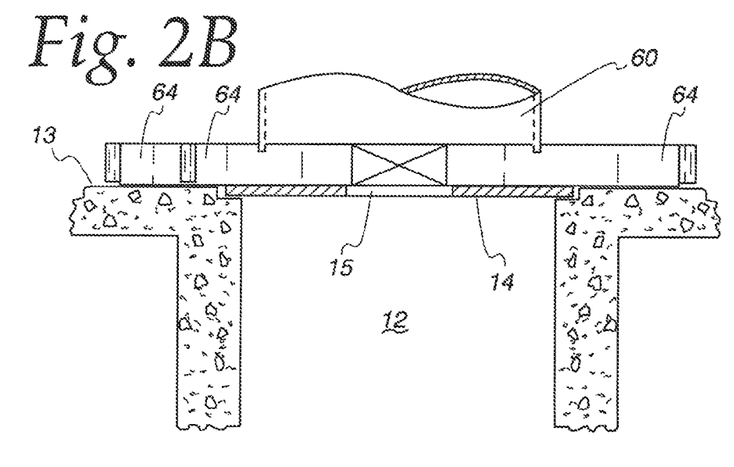
FIG. 2B is a side cross-sectional view of the vanes, duct, and a portion of the grit storage chamber beneath the separation chamber.
Figure 3:
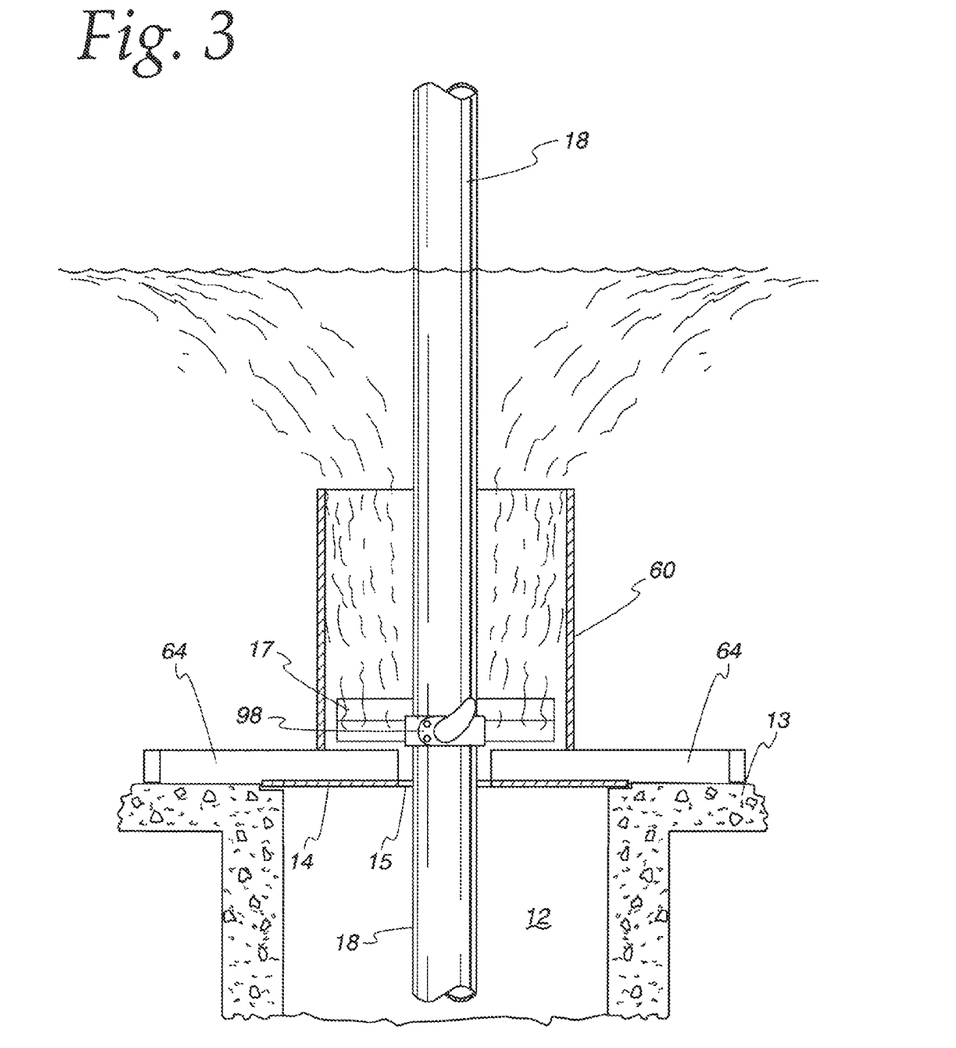
FIG. 3 is a side cross-sectional view through the center of the FIG. 1 apparatus illustrating fluid flow therein.

As best shown in FIG. 2B, a circular opening 15 in the center plate 14 permits communication between chambers 11 and 12. The surfaces defining the chambers 11 and 12 may be made, for example, from concrete or steel.

A multi-bladed propeller 17 is mounted on a hollow cylindrical shaft 18 for rotation about a vertical axis centered in the circular opening 15, the diameter of shaft 18 being substantially less than that of opening 15. The upper portion of the shaft 18 is connected, for example, to a suitable variable speed gear box and motor assembly 19 supported on a platform 20 for rotating the propeller 17 at various speeds.

The construction of the propeller 17 has a mounting plate 98 (see FIG. 3) at each end of the blade. By bolting these mounting plates together in a chain, the chain can be bolted together, clamping them around the shaft 18. Depending on which end of the blade is mounted to the shaft 18, the propeller 17 can turn clockwise or counterclockwise. Alternatively, the propeller 17 may be attached to the shaft 18 as shown and described in U.S. Pat. Nos. 4,107,038 and 4,767,532, the disclosures of which are herein incorporated by reference. Still other propeller constructions may also be used within the scope of some aspects of the invention described herein.

An inlet trough 40 has a covered downwardly extending influent flume portion 41 to introduce an influent liquid stream directly into a lower portion (i.e., the bottom) of separation chamber 11. The flume portion 41 includes a ramp at its bottom which may be advantageously sloped at about 20 degrees, with the ramp and the ceiling of the flume portion 41 being substantially parallel.

The flume portion 41 also has an outer wall 42 that tangentially intersects the lower portion of the separation chamber 11 so as to cause the incoming influent liquid stream to flow tangentially into the chamber 11.

A flow inducer (or baffle or eductor) 45 extends upwardly from the chamber floor 13 at the bottom of the flume portion 41 at the side of the flume portion 41 spaced from the outer wall 46 of the separation chamber 11, and is tapered toward the outer wall 46 to narrow the exit from the flume portion 41.

An annular, ring-shaped flange 48 is secured or married around the separation chamber outer wall 46. Advantageously, the flange 48 may be positioned above the chamber floor 13 a distance which is substantially equal to the vertical height at the bottom end of the flume portion 41. The flow inducer 45 may also be advantageously secured or married to the bottom of the flange 48.

It should be appreciated that the exit at the bottom of the flume portion 41 narrowed by the flow inducer 45 trowels the flow of the incoming liquid sewage into having a slightly increased flow velocity with more laminar flow, inducing the flow to come around a channel ring 50 in the separation chamber 11, with the ring being above the chamber floor 13, below the flange 48, and around the inside of the chamber outer wall 46. Further, it should be appreciated that this flow will direct the influent stream towards a lower portion of the outer wall 46 and thereby precluding the influent stream from spreading inwardly across floor 13, or upwardly along the outer wall 46.

The hydraulics of this configuration maintain flow in the channel ring 50. Further, the chamber floor 13 serves to convey grit toward its center (i.e., toward storage chamber 12).

At the center of the separation chamber 11 and generally concentric with the propeller shaft 18 is a tubular shaped duct 60, having a plurality of guide vanes 64 attached to the bottom thereof. The duct 60 may advantageously have a diameter slightly less than the diameter of the storage chamber 12, and may be made in two pieces which can be bolted together in the field.

The vanes 64 are generally spirally oriented, and may advantageously emanate at their inner end (best seen in FIG. 2A) in a generally radial direction from adjacent the center plate circular opening 15 and spiral from that end toward the general direction of circular flow in the separation chamber 11. Each vane 64 also defines vertical faces on its opposite sides, whereby the bottom of each vane 64 is positioned against the center plate 14 with the tops of the vanes 64 supporting the duct 60 at a defined spacing above the center plate 14. As also described further below, according to one aspect of the present invention the vanes 64 advantageously guide grit flow along a slightly curved radial line to opening 15 in the plate 14 through which the grit drops into the storage chamber 12.

In one advantageous configuration, six vanes 64 may be provided, spaced apart sixty degrees around the center with the outer end of each vane 64 being along a radius oriented between about thirty and sixty (e.g., about forty-five) degrees from the radial direction of the inner end of the vane 64. Advantageously, the ends of the vanes 64 may be oriented in a circle having a diameter of about eight to ten feet, with the duct 60 having a cylindrical diameter of about four feet. The blades of the propeller 17 are positioned inside the duct 60 and thus in such an installation would extend out to a diameter slightly less than the inner diameter of the duct 60.

The vanes 64 may each be welded to the center plate 14, and/or otherwise suitably secured to the duct 60 (including, e.g., by suitable anchors 66) to ensure that the vanes 64 (and attached duct 60) are secured in the desired centered position relative to the chamber floor 13 and storage chamber 12.

An outlet or effluent trough 70 has an effluent flume portion 72 which extends to an upper portion of separation chamber 11 for removing an effluent liquid stream from an upper portion of chamber 11 adjacent its outer periphery. The effluent flume portion 72 is elevated above the influent flume portion 41.

The outer wall 74 of the effluent flume portion 72 is substantially parallel and in the same vertical plane as separation chamber outer wall 46, and tangentially intersects the upper portion of separation chamber 11.

Figure 1:
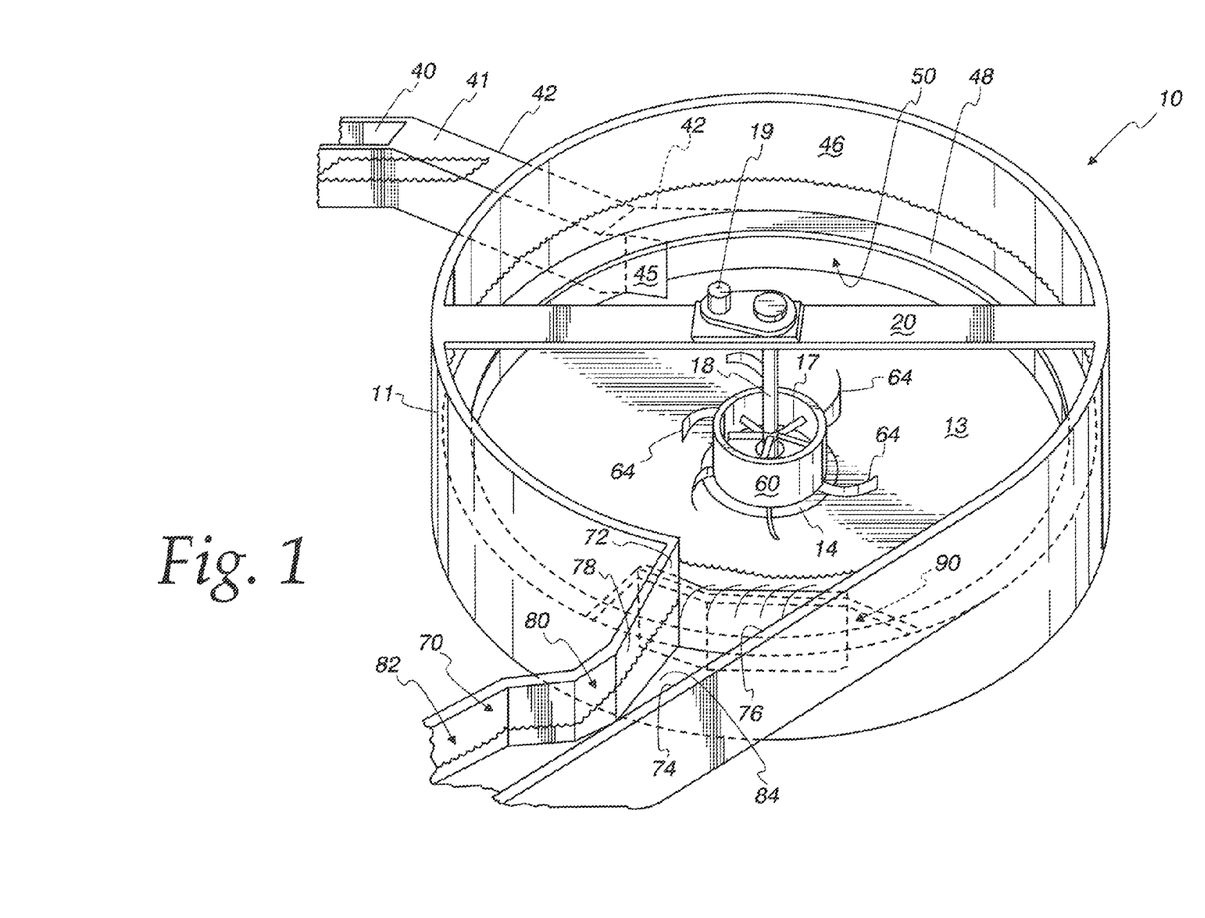
FIG. 1 is a perspective view of a grit separating apparatus incorporating various aspects of the present invention.

The influent flume portion 41 and effluent flume portion 72 in the embodiment illustrated in FIG. 1 are generally at right angles to one another, with the influent and effluent flume portions 41, 72 oriented and spaced about ninety degrees apart around the separation chamber 11. However, it should be appreciated that the present invention as already and further described herein allows the flume portions 41, 72 to be at a variety of different orientations, including but not limited to generally parallel orientations (with the effluent being output from the same side as [and in the same general direction as] the influent, as well as with the effluent being output at 180 degrees from [i.e., in the opposite direction of] the influent).

The walls 76, 78 of effluent flume portion 72 may advantageously be tapered from a wide portion at the opening to the separation chamber 11 to a narrowed width section 80, after which the effluent flume portion may be tapered back out to a greater width section 82 for discharging exiting fluid. It should be appreciated that the width of the opening to the effluent flume portion 72, which is wider than the width at the end of the flow inducer 45 at the bottom of the influent flume portion 41, will result in a relatively low fluid flow velocity and flow gradient from the separation chamber 11 into the effluent flume portion 72. Such low fluid flow velocity to the effluent flume portion 72 will prevent the undesirable drawing of grit thereto (instead of into the storage chamber 12 as desired), which could occur at higher fluid velocities.

The floor 84 of the effluent flume portion 72 extends to the outer wall 46 of the separation chamber 11 at a height substantially corresponding to the height of the flange 48 in the separation chamber 11. Moreover, under the opening in the separation chamber wall 46 for the effluent flume portion 72, a tunnel 90 is provided along the outer portion of the separation chamber 11, with the tunnel 90 having a top 92 substantially corresponding to the flange 48 at that portion of the separation chamber 11 and an inner wall 94 substantially concentric with and spaced inwardly from the separation chamber outer wall 46. Thus, in the illustrated embodiment, the flow path of liquid from the influent to effluent flume portions 41, 72 will be at least about 450 degrees, whereas with an embodiment with 180 degree spacing of the flume portions 41, 72 as previously mentioned the flow path would be at least about 540 degrees. It should thus be appreciated that influent flow from the influent flume portion 41 will naturally flow through the tunnel 90 and thereby be prevented from flowing directly to the effluent flume portion 72, and further flow in the tunnel 90 will not be affected by effluent flow to the effluent flume portion 72.

While the sizes of components of apparatuses 10 according to the present invention may vary according to design criteria, the sizes of components which have been found to be suitable in at least some circumstances are set forth below, identified by different examples.

The flow inducer 45 (installed at the location where the influent flume portion 41 joins the separation chamber 13) reduces the trough width by one foot (with the height the same as the height of the influent channel):

| Example | H | L |
|---------|-----|-----|
| A* | N/A | N/A |
| B* | N/A | N/A |
| C* | N/A | N/A |
| D | 1'-6" | 1'-0" |
| E | 1'-9" | 1'-6" |
| F | 2'-0" | 1'-6" |
| G | 2'-11" | 2'-0" |
| H | 3'-9" | 2'-0" |
| I | 4'-11" | 2'-0" |
| J | 5'-6" | 2'-0" |
| K | 5'-6" | 2'-0" |

*(Examples A, B and C do not include flow inducers).

The ring-shaped flange 48 mounts around entire circumference of the separation chamber 11 in a circular orientation:

| Example | Projection Out From Wall |
|---------|--------------------------|
| A | 6" |
| B | 6" |
| C | 6" |
| D | 7" |
| E | 9" |
| F | 9" |
| G | 12" |
| H | 14" |
| I | 16" |
| J | 18" |
| K | 24" |

The tunnel 90 projects beyond each side of the width of the effluent trough 70 and projects out into the separation chamber lithe full width of the effluent trough:

| Example | L Length at Wall | W | H |
|---------|------------------|-------|--------|
| A | 2'-10" | 1'-0" | 2'-11" |
| B | 2'-10" | 1'-0" | 2'-11" |
| C | 4'-6" | 1'-0" | 2'-11" |
| D | 5'-0" | 1'-6" | 2'-11" |
| E | 8'-0" | 2'-6" | 2'-11" |
| F | 9'-0" | 3'-0" | 2'-11" |
| G | 10'-0" | 4'-0" | 2'-11" |
| H | 10'-6" | 4'-6" | 3'-9" |
| I | 11'-0" | 5'0" | 4'-11" |
| J | 12'0" | 6'0" | 5'-6" |
| K | 14'-0" | 8'0" | 5'-6" |

The guide vanes 64 may be substantially the same orientation for the various examples, with six vanes 64 provided. The vanes are 4" or 6" tall; 30" or 57½" long (depending on the model size of the example), and rolled, with a 1½" pipe 68 mounted on the vane end to prevent stringy material from hanging up on the end of the vane 64.

The duct 60 may be substantially the same orientation in each example. In the examples, the diameter is 2'-9" to 4'-0", with the height varied depending on the installation:

| Example | Diameter | Height |
|---------|----------|--------|
| A | 2'-9" | 2'-0" |
| B | 2'-9" | 2'-0" |
| C | 2'-9" | 2'-0" |
| D | 2'-9" | 2'-0" |
| E | 2'-9" | 2'-0" |
| F | 2'-9" | 2'-0" |
| G | 4'-0" | 2'-0" |
| H | 4'-0" | 3'-0" |
| I | 4'-0" | 4'-0" |
| J | 4'-0" | 5'-0" |
| K | 4'-0" | 6'-0" |

The inverted "U" tunnel 100 in the influent flume portion 41 extends across the entire width of the influent flume portion 41 and has a height intended to reduce the height of the influent flume portion 41 to maintain flow velocities:

| Example | L | W |
|---------|-------|-------|
| A* | N/A | N/A |
| B* | N/A | N/A |
| C* | N/A | N/A |
| D | 8'-0" | 1'-3" |
| E | 8'-0" | 2'-6" |
| F | 8'-0" | 2'-6" |
| G | 8'-0" | 4'-0" |
| H | 11'-0" | 4'-6" |
| I | 16'-0" | 5'-0" |
| J | 18'-0" | 6'-0" |
| K | 18'-0" | 8'-0" |

*(Examples A, B and C do not include an inverted "U" tunnel).

It should thus be appreciated that operation of the apparatus 10 may advantageously be as follows.

Water or sewage from which solid grit particles are to be removed is introduced into separation chamber 11 through inlet trough 40 and influent flume portion 41 as an influent stream. The flow of the influent stream is directed downwardly as it passes through influent flume portion 41 and thereby enters a lower portion of separation chamber 11. The flow of the influent stream is partially constrained by flow inducer 45 and tunnel 90 which direct the influent stream toward the peripheral wall 46 of the chamber 11 and prevent the flow from spreading across the chamber floor 13.

As the flow of the influent stream moves around the peripheral wall 46, the width of the stream is narrowed by centrifugal force as it flattens against the wall 46, thereby increasing its velocity as it moves around the chamber 11. The liquid, grit and organics near the bottom center core area of the separation chamber 11 are guided in a spiral rotation by the guide vanes 64 into the duct 60, with the high velocity blade profile of the ducted propellers 17 operating inside the duct 60 to force water and organics upward in the duct 60, and grit into the storage chamber 12.

More specifically, the rotating propeller 17 is caused to rotate at a higher speed than the velocity of the liquid rotating in the separation chamber 11 in the same direction as liquid flow. This forces the liquid in the center core duct 60 to flow upwards around the axis of the shaft 18 (see FIG. 3). The increased velocity across the floor 13 increases the movement of the heavier particles towards the grit storage chamber 12, with the lighter particles and organics being picked up by the increased flow and carried up through the duct 60, so that they are subsequently carried out with the effluent stream.

Water is thus forced from the duct 60 by the propeller 17 to the top area of the separation chamber 11 where it flows horizontally and radially outwardly (see FIG. 3) to the volume of the chamber 11 above the flange 48, with the upper volume around the chamber 11 guided to the effluent flume portion 72 above the flange 48. The upward flow caused by the propeller 17 facilitates in washing organics out of the grit, as desired, so that the organics may be carried with the fluid out of the separation chamber 11 through the effluent flume portion 72.

The flow level in the separation chamber 11 is controlled by the formula $$H = \left(\frac{Q}{3.09(W)}\right)^{2/3}$$

where Q equals flow in ft$^3$/sec and H height and W width (in feet) of the narrowed width section 80 of the effluent flume portion 72, where flow Q in the ring may preferentially be between 2'/sec and 4'/sec. The greater width section 82 of the effluent flume portion 72 can control effluent flume velocity and elevation by the formula, Depth equals $$\sqrt[3]{\left(\frac{Q}{W}\right)^2 \frac{1}{g}}$$

(of course, depth controls velocity).

It should also be appreciated that water level in the influent is controlled by the width of the narrowed width section 80 of the effluent flume portion 72 (see FIG. 4) and may be determined from the expression $$\left(\frac{Q}{3.09(W)}\right)^{2/3}.$$

Figure 6:
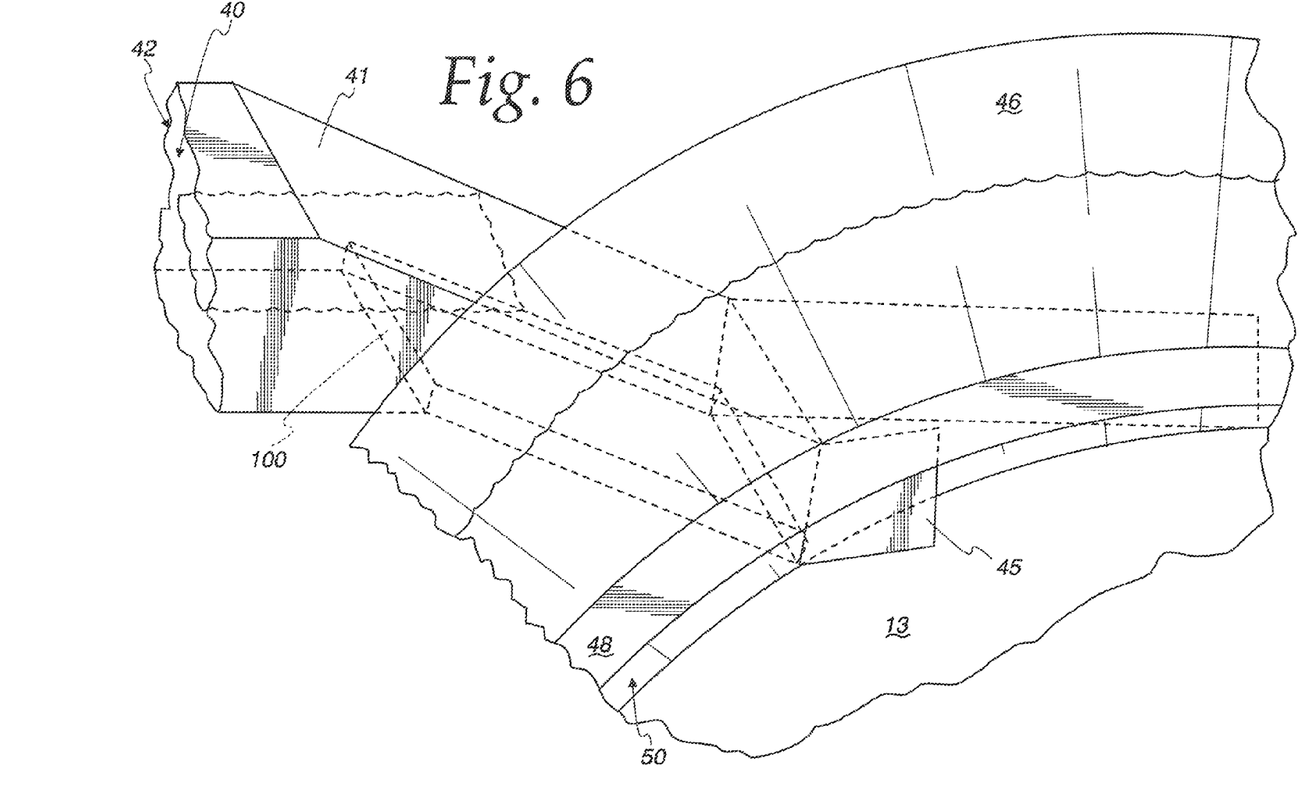
FIG. 6 is a partial perspective showing the influent flume into the separation chamber of the present invention.

Thus, for example, a maximum design flow of 70 MGD (108 ft$^3$/sec), using a 10 to 1 turn down, will result in flow through the separation chamber 11 of 10.8 ft$^3$/sec, which equates to a water depth of 1.1 ft. By, for example, adding an inverted "U" tunnel 100 having a height of 11 inches mounted to the bottom of the influent flume portion 41 (see FIG. 6), a flow velocity through the tunnel of 2 feet per second can be achieved. Thus, when the influent level in the flume portion 41 drops to 11 inches, the flow in the inverted "U" tunnel 100 will be 11 inches and keep the minimum bottom ring web flow at 4'/sec (see FIG. 4), in addition to the bottom flange flow at 2'/sec, the well flow at 3.5°/sec, and ring flow 42 at 4'/sec. whereby the grit will be attached to the bottom 13.

Figures 4, 4A:
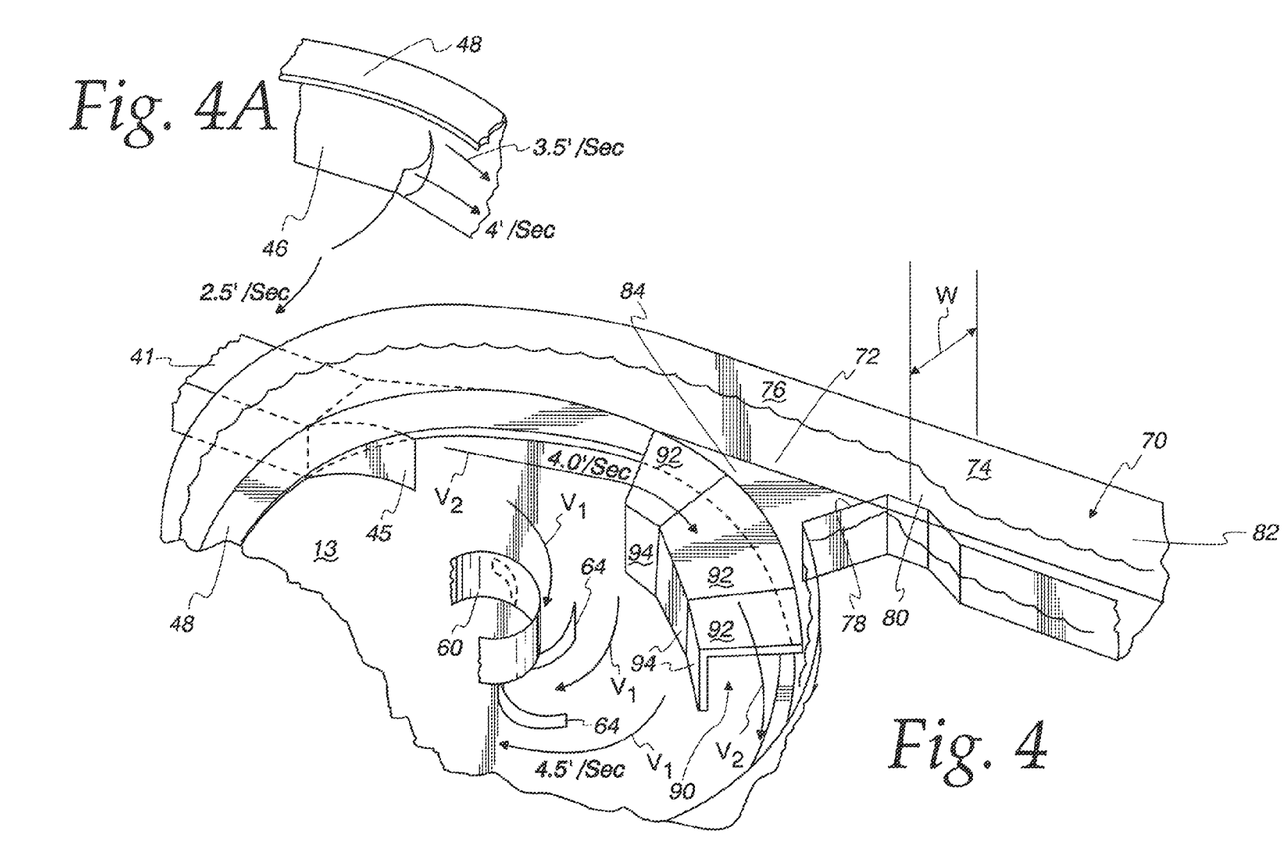
FIG. 4 is a partial perspective view of an alternative embodiment of the grit separating apparatus in which the influent and effluent flumes are aligned.
FIG. 4A is a partial view of FIG. 4 illustrating fluid flow in the separation chamber.
Figure 5:
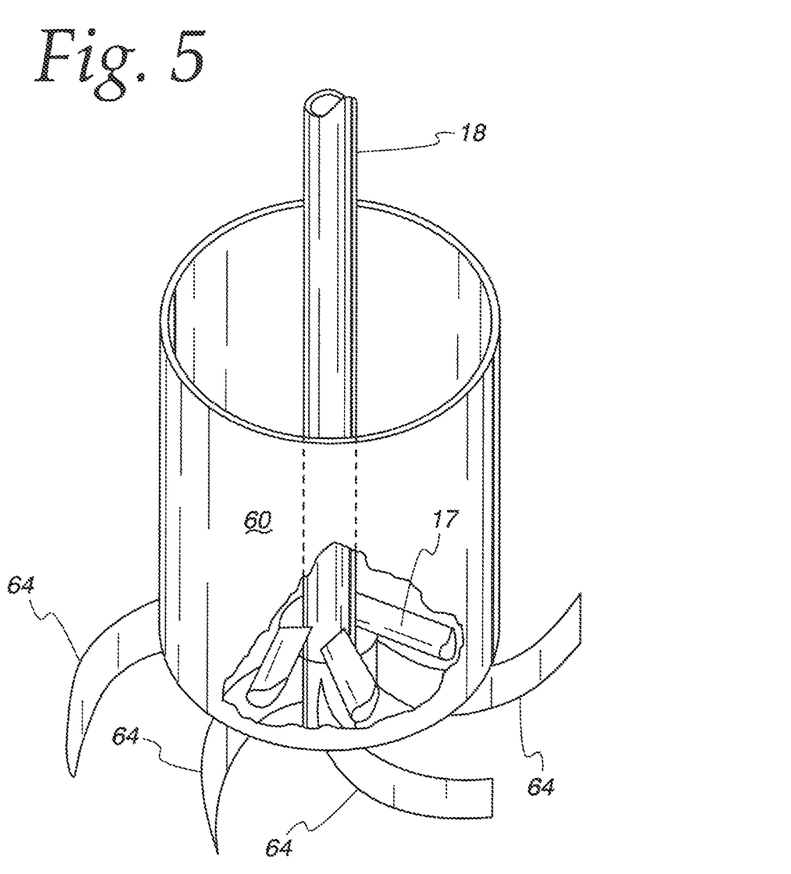
FIG. 5 is a perspective, partially broken away, view showing the duct, vanes and propeller of the FIG. 1 embodiment.

The flow in the separation chamber 11 is circular flow into the center bringing grit to the center hole of the grit storage chamber 12. Normally this flow is outward in a vortex basin. However, that is not the case with the separation chamber 11 of the present invention, where the bottom 6 inches (when the vanes 64 have a height of about 6 inches) has a velocity of $V_1$ (e.g., 4.5 feet per second; see FIG. 4) caused by the guide vanes 64 and the high flow propeller 17. This is higher than the velocity $V_2$ (e.g., 4.0 feet per second; see FIG. 4) in the tunnel 90 and under the flange 48 around the exterior of the separation chamber 11. Therefore, the centrifugal force $$\frac{(V_2)^2}{2g}$$

is toward the highest velocity $V_1$, and thus the grit attached to the bottom 13 flows in a slightly curved radial line to the grit storage chamber 12 at the center.

Grit (e.g., silica sand) does not normally flow. That is, a pile of sand remains standing as a pile of sand (whereas a pile of water, e.g., will flow out flat). In order for grit to flow, each particle must be surrounded by water, with the water moving or flowing to push the grit in a flowing motion. Moreover, it should be appreciated that faster moving particles will push aside slower moving particles (just as faster moving people will push slower moving people aside). Thus it should be appreciated that grit is pushed by higher velocity to lower velocity caused by the friction of the floor 13, while aided by gravity. The grit is pushed along the floor 13 where it will not be surrounded by water (e.g., on the bottom side). Thus, the grit will always be pushed down on the floor and, as desired, will not be drawn up and cannot reach the effluent flume portion. Rather, the grit will reliably be pushed across the floor 13 in a slightly curved radial line to the grit storage chamber 12 at the center as mentioned.

As alluded to hereinabove, in prior art grit removal devices operating on the forced vortex principle, the head at the periphery of the separation chamber is higher than at the center of the separation chamber. This causes liquid to flow down the peripheral wall of the separation chamber to the floor and across the floor to the point of lower head at the center. The solid particulate matter in suspension must follow the constant angular velocity path to reach the floor and be carried to the center for direction to the grit storage chamber. This flow pattern takes time and some of the solid particulate matter does not travel the complete circuit before it is caught in the flow passing out the effluent flume. This results in inefficient removal of the solid particulates.

In contrast, the grit removal apparatus 10 of the present invention directs all of the influent flow into a lower portion of the separation chamber 11 where the bulk of the solid particulate matter remains. The flow patterns within the separation chamber 11 are such that the solid particulates do not have to travel as far to avoid the influence of the effluent stream and thus move faster to the center where they are not affected by the exit velocity thereof.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

The invention claimed is:

1. In an apparatus for separating grit from a liquid stream, said apparatus including a cylindrical separation chamber having an influent and an effluent flume for liquid with a cylindrical grit storage chamber disposed immediately below the separation chamber, said chambers separated by a transition surface having a centrally disposed opening therethrough for passage of separated grit to said grit storage chamber, a central flow drive comprising:
   a duct substantially cylindrical about an axis and adapted to be supported in said separation chamber above the centrally disposed opening in said transition surface;
   a plurality of vanes adapted to be secured between said duct and the transition surface in an upwardly extending orientation and spiraling outwardly from said duct in the same direction as liquid flow within the separation chamber;
   a propeller supported for rotation in said duct about said duct axis, rotation of said propeller drawing liquid in said duct upwardly; and
   a drive for rotating said propeller about said duct axis.

2. The central flow drive of claim 1, wherein when said duct is supported in the separation chamber, the duct axis is substantially vertical and rotation of said propeller is in the same direction as liquid flow within said separation chamber.

3. The central flow drive of claim 1, wherein when supported in the separation chamber, said propeller rotates at a sufficient rate to cause a spiral flow pattern across said transition surface and between said vanes so as to cause heavier particles to pass through said opening into said grit storage chamber and lighter particles to be lifted upwardly through the duct.

4. An apparatus for separating grit from a liquid stream while retaining organic solids therein, comprising:
   a cylindrical separation chamber;
   a cylindrical grit storage chamber having a smaller diameter than said separation chamber, and disposed immediately below said separation chamber;
   a transition surface separating said separation chamber and said storage chamber, said transition surface including a centrally disposed opening therethrough permitting communication between said separation chamber and said storage chamber;
   an influent flume for introducing an influent liquid stream directly into a lower portion of said separation chamber along the outer periphery thereof;
   an effluent flume for removing an effluent liquid stream from an upper portion of said separation chamber along the outer periphery thereof;
   a baffle positioned within said separation chamber for directing the influent liquid stream entering said separation chamber outwardly towards a lower portion of the periphery of said separation chamber and preventing the spreading thereof across said transition surface, said baffle narrowing the influent liquid stream exiting the influent flume;
   a plurality of vanes secured to and extending upwardly from said transition surface, said vanes spiraling outwardly from said grit storage chamber in a direction reverse to liquid flow within the separation chamber;
   a cylindrical duct supported above said vanes; and a propeller supported in said cylindrical duct above said transition surface for rotation about a substantially vertical axis in the same direction as liquid flow within said separation chamber to draw fluid flow up through said duct toward the upper portion of the separation chamber.

5. The apparatus of claim 4, wherein said propeller rotates at a sufficient rate to cause a spiral flow pattern across said transition surface and between said vanes so as to cause heavier particles to pass through said opening into said grit storage chamber and lighter particles to be lifted upwardly through the duct.

6. The apparatus of claim 4, wherein said propeller comprises a plurality of propeller blades, and further comprising:
    a drive shaft rotatable about said vertical axis;
    mounting plates on each end of each propeller blade;
    whereby said mounting plates are selectively mounted to said drive shaft to secure a selected end of each propeller blade to said drive shaft.

7. The apparatus of claim 4, wherein said effluent flume comprises a channel tapered from a wide exit out of the separation chamber to a narrower portion spaced from the separation chamber.

8. The apparatus of claim 4, wherein said baffle narrows the influent liquid stream entering the influent flume.

9. The apparatus of claim 8, wherein said effluent flume comprises a channel tapered from a wide exit out of the separation chamber to a narrower portion spaced from the separation chamber.

10. The apparatus of claim 4, further comprising a tunnel in the grit separation chamber communicating with the effluent flume and defining an entrance to the effluent flume at a selected location in said separation chamber.

11. An apparatus for separating grit from a liquid stream while retaining grit and processing organic solids for further treatment therein, comprising:
    a separation chamber having an outer substantially vertical cylindrical wall and a bottom transition surface;
    a cylindrical grit storage chamber having a smaller diameter than said separation chamber, and disposed immediately below said separation chamber, said transition surface separating said separation chamber and said storage chamber and including a centrally disposed opening therethrough permitting communication between said separation chamber and said storage chamber;
    an influent flume for introducing an influent liquid stream directly into a lower portion of said separation chamber along the outer periphery thereof;
    an effluent flume channel for removing an effluent liquid stream from an upper portion of said separation chamber through an opening in an upper portion of said separation chamber wall, said channel having a bottom;
    a baffle positioned within said separation chamber for directing the influent liquid stream entering said separation chamber outwardly towards a lower portion of the periphery of said separation chamber and preventing the spreading thereof across said transition surface;
    a tunnel defined by a portion of said separation chamber wall, an upper wall, and an inner generally arcuate wall,
    said portion of said separation chamber wall being the separation chamber wall beneath said separation chamber wall opening to said effluent flume,
    said upper wall extending substantially radially into said separation chamber from said separation chamber wall from in front of said separation chamber wall opening, wherein the height of the top of said upper wall and the effluent flume channel bottom are substantially the same, and
    said inner wall is generally concentric with said separation chamber wall portion; and
    a propeller supported above said transition surface for rotation about a substantially vertical axis in a direction reverse to liquid flow within said separation chamber to draw fluid flow up through said duct toward the upper portion of the separation chamber.

12. The apparatus of claim 11, further comprising a ring extending inwardly from said separation chamber wall with said tunnel upper wall defining a portion of said ring, said ring being above the lower portion of the periphery of said separation chamber.

13. The apparatus of claim 11, wherein said effluent flume channel is tapered from a wide said opening in an upper portion of said separation chamber wall to a narrower portion spaced from the separation chamber.

14. The apparatus of claim 11, wherein said baffle narrows the influent liquid stream entering the influent flume.

15. The apparatus of claim 14, wherein said effluent flume channel is tapered from a wide said opening in an upper portion of said separation chamber wall to a narrower portion spaced from the separation chamber.

16. An apparatus for separating grit from a liquid stream while retaining organic solids therein, comprising:
    a separation chamber having an outer substantially vertical cylindrical wall and a bottom transition surface;
    a cylindrical grit storage chamber having a smaller diameter than said separation chamber, and disposed immediately below said separation chamber, said transition surface separating said separation chamber and said storage chamber and including a centrally disposed opening therethrough permitting communication between said separation chamber and said storage chamber;
    an influent flume for introducing an influent liquid stream directly into a lower portion of said separation chamber along the outer periphery thereof;
    an effluent flume channel for removing an effluent liquid stream from an upper portion of said separation chamber through an opening in an upper portion of said separation chamber wall, said channel having a bottom;
    a baffle positioned within said separation chamber for directing the influent liquid stream entering said separation chamber outwardly towards a lower portion of the periphery of said separation chamber and preventing the spreading thereof across said transition surface, said baffle narrowing the influent liquid stream exiting the influent flume;
    a plurality of vanes secured to and extending upwardly from said transition surface, said vanes spiraling outwardly from said grit storage chamber in the same direction as liquid flow within the separation chamber;
    a cylindrical duct supported above said vanes;
    a tunnel defined by a portion of said separation chamber wall, an upper wall, and an inner generally arcuate wall,
    said portion of said separation chamber wall being the separation chamber wall beneath said separation chamber wall opening to said effluent flume,
    said upper wall extending substantially radially into said separation chamber from said separation chamber wall from in front of said separation chamber wall opening, wherein the height of the top of said upper wall and the effluent flume channel bottom are substantially the same, and said inner wall is generally concentric with said separation chamber wall portion;

a ring extending inwardly from said separation chamber wall with said tunnel upper wall defining a portion of said ring, said ring being above the lower portion of the periphery of said separation chamber; and a propeller supported in said cylindrical duct above said transition surface for rotation about a substantially vertical axis in the same direction as liquid flow within said separation chamber to draw fluid flow up through said duct toward the upper portion of the separation chamber.

17. The apparatus of claim 16, wherein said propeller rotates at a sufficient rate to cause a spiral flow pattern across said transition surface and between said vanes so as to cause heavier particles to pass through said opening into said grit storage chamber and lighter particles to be lifted upwardly through the duct.

18. The apparatus of claim 16, wherein said effluent flume channel is tapered from a wide said opening in an upper portion of said separation chamber wall to a narrower portion spaced from the separation chamber.

19. The apparatus of claim 16, wherein said baffle narrows the influent liquid stream exiting the influent flume.

20. The apparatus of claim 19, wherein said effluent flume channel is tapered from a wide said opening in an upper portion of said separation chamber wall to a narrower portion spaced from the separation chamber.

21. The apparatus of claim 16, wherein grit is pushed by hydraulic flow aided by gravity to the transition surface where it attaches and is hydraulically pushed to the cylindrical grit storage chamber.

* * * * *